(12) United States Patent
Wang et al.

(10) Patent No.: US 11,947,426 B2
(45) Date of Patent: Apr. 2, 2024

(54) METHOD, ELECTRONIC DEVICE, AND COMPUTER PROGRAM PRODUCT FOR RECOMMENDING PROTECTION STRATEGY

(71) Applicant: EMC IP Holding Company LLC, Hopkinton, MA (US)

(72) Inventors: Ren Wang, Shanghai (CN); Qi Wang, Shanghai (CN); Yun Zhang, Shanghai (CN); Ming Zhang, Shanghai (CN); Weiyang Liu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 149 days.

(21) Appl. No.: 17/523,364

(22) Filed: Nov. 10, 2021

(65) Prior Publication Data

US 2023/0116599 A1 Apr. 13, 2023

(30) Foreign Application Priority Data

Oct. 8, 2021 (CN) .......................... 202111172796.5

(51) Int. Cl.
*G06F 12/00* (2006.01)
*G06F 11/14* (2006.01)
*G06F 18/232* (2023.01)

(52) U.S. Cl.
CPC ........ *G06F 11/1461* (2013.01); *G06F 18/232* (2023.01)

(58) Field of Classification Search
CPC ............. G06F 11/1461; G06F 11/1458; G06F 11/1446; G06F 11/07; G06F 18/232; G06F 3/0614; G06F 3/065; G06F 12/16
See application file for complete search history.

(56) References Cited

U.S. PATENT DOCUMENTS

| 2014/0181046 | A1* | 6/2014 | Pawar | ..................... G06F 16/27 707/654 |
| 2019/0266279 | A1* | 8/2019 | Aseev | ..................... G06F 21/78 |

* cited by examiner

*Primary Examiner* — Shawn X Gu
(74) *Attorney, Agent, or Firm* — WOMBLE BOND DICKINSON (US) LLP

(57) ABSTRACT

Embodiments of the present disclosure relate to a method, an electronic device, and a computer program product for recommending a protection strategy. The method includes obtaining contents of attributes of a plurality of data assets adjusted. The method further includes generating a plurality of vector representations for the plurality of data assets based on the contents of the attributes. The method further includes dividing the plurality of data assets into at least one category based on the plurality of vector representations. The method further includes if it is determined that a protection strategy for one data asset in the at least one category exists, determining the protection strategy as a recommended strategy for another data asset in the at least one category.

20 Claims, 4 Drawing Sheets

METHOD, ELECTRONIC DEVICE, AND COMPUTER PROGRAM PRODUCT FOR RECOMMENDING PROTECTION STRATEGY

CROSS-REFERENCE TO RELATED APPLICATION

This patent application claims priority, under 35 U.S.C. § 119, of Chinese Patent Application No. 202111172796.5, filed Oct. 8, 2021, which is incorporated by reference in its entirety.

TECHNICAL FIELD

Embodiments of the present disclosure relate to the field of data storage, and more particularly, to a method, an electronic device, and a computer program product for recommending a protection strategy.

BACKGROUND

With rapid development of computer technologies, many data assets such as virtual machines, databases, and documents are produced. Data assets will be continuously increased over time, resulting in more and more data assets of users. Since these data assets are very useful information for users, in order to guarantee safety of the data assets, the data assets usually will be backed up.

By backing up the data assets reasonably, when the data assets have problems, such as data loss, lost data can be recovered from backup, thereby guaranteeing the safety of the data assets. However, there are still many problems to be solved in the process of managing data assets.

SUMMARY OF THE INVENTION

Embodiments of the present disclosure provide a method, an electronic device, and a computer program product for recommending a protection strategy.

According to a first aspect of the present disclosure, a method for recommending a protection strategy is provided. The method includes obtaining contents of attributes of a plurality of data assets adjusted. The method further includes generating a plurality of vector representations for the plurality of data assets based on the contents of the attributes. The method further includes dividing the plurality of data assets into at least one category based on the plurality of vector representations. The method further includes if it is determined that a protection strategy for one data asset in the at least one category exists, determining the protection strategy as a recommended strategy for another data asset in the at least one category.

According to a second aspect of the present disclosure, an electronic device is provided. The electronic device includes at least one processor; and a memory coupled to the at least one processor and having instructions stored thereon, wherein the instructions, when executed by the at least one processor, cause the device to perform actions including: obtaining contents of attributes of a plurality of data assets adjusted; generating a plurality of vector representations for the plurality of data assets based on the contents of the attributes; dividing the plurality of data assets into at least one category based on the plurality of vector representations; and if it is determined that a protection strategy for one data asset in the at least one category exists, determining the protection strategy as a recommended strategy for another data asset in the at least one category.

According to a third aspect of the present disclosure, a computer program product is provided, which is tangibly stored on a non-volatile computer-readable medium and includes machine-executable instructions, wherein the machine-executable instructions, when executed, cause a machine to perform steps of the method in the first aspect of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings. In the example embodiments of the present disclosure, the same reference numerals generally represent the same members.

Identical or corresponding numerals represent identical or corresponding parts in various accompanying drawings.

DETAILED DESCRIPTION

Figure 1:
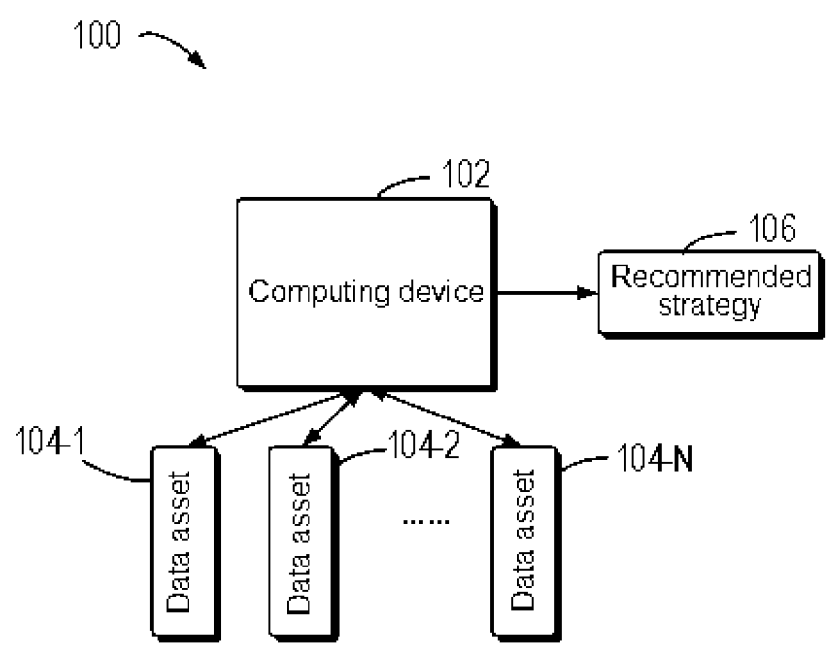
FIG. 1 illustrates a schematic diagram of example environment 100 in which the device and/or method according to embodiments of the present disclosure can be implemented.

Embodiments of the present disclosure will be described in more detail below with reference to the accompanying drawings. Although the accompanying drawings show certain embodiments of the present disclosure, it should be understood that the present disclosure can be implemented in various forms and should not be limited by the embodiments described herein. Instead, these embodiments are provided to enable a more thorough and complete understanding of the present disclosure. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

The principles of the present disclosure will be described below with reference to several example embodiments illustrated in the accompanying drawings. Although preferred embodiments of the present disclosure are illustrated in the accompanying drawings, it should be understood that these embodiments are described merely to enable those skilled in the art to better understand and then implement the present disclosure, and not to limit the scope of the present disclosure in any way.

As described above, for data assets, protection strategies need to be configured to back up the data assets. The protection strategies of the data assets are configured to regularly create and manage backups of the assets. The protection strategies typically include what assets should be protected and when a backup operation should be executed. For example, backup is started from a certain time and is executed once per hour, per day, per week, or per month, and whether full backup or incremental backup is performed. The data assets are backed up according to the protection strategies set for the data assets.

In a conventional scheme for backing up data assets, for those data assets with no protection strategy or those newly found/added to the system, users usually need to manually configure protection strategies, and the setting process is based on their own experience. However, manually allocating protection strategies to data assets by users is not friendly to the users, which may cause some problems. For example, different users may create different strategies which may be similar/repeated, and some conflicts may be caused when protection is run on the same time window. In addition, one strategy may protect a large number of assets that possibly have "great differences" (located in different data centers, having a variety of magnetic disks, etc.), and sometimes, users do not know how to select a proper protection strategy for new assets. Although some "default" strategies may have been provided, users may still not know how to select from them when facing new assets.

In order to at least address the above and other potential problems, an embodiment of the present disclosure provides a method for recommending a protection strategy. In the method, a computing device obtains contents of attributes of a plurality of data assets adjusted. Then, the computing device generates a plurality of vector representations for the plurality of data assets based on the contents of the attributes. The plurality of data assets are divided into at least one category by using the plurality of vector representations. If it is determined that a protection strategy for one data asset in the at least one category exists, the computing device determines the protection strategy as a recommended strategy for another data asset in the at least one category. By means of the method, a user can easily select a proper protection strategy and can effectively reuse existing strategies, thereby improving user experience.

The embodiments of the present disclosure will be further described in detail in combination with the accompanying drawings below. FIG. 1 shows a schematic diagram of example environment 100 in which the embodiment of the present disclosure can be implemented.

Example environment 100 includes computing device 102. Computing device 102 is configured to manage data assets associated thereto and configured to recommend and configure protection strategies for corresponding data assets.

Computing device 102 includes, but is not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, a distributed computing environment including any of the above systems or devices, etc.

Example environment 100 further includes data assets 104-1, 104-2, . . . , 104-N, where N is a positive integer. To facilitate description, the data assets are collectively referred to as data assets 104 hereinafter. The data assets herein are data resources that are owned or controlled by individuals or enterprises and recorded in a physical or electronic mode, such as virtual machines, databases, and documents.

Computing device 102 performs a clustering operation on data assets 104, and then allocates data assets 104 to different categories. Computing device 102 then determines a protection strategy that has been configured for some data assets in each category, and then recommends the protection strategy as recommended strategy 106 to other data assets that are not configured with the protection strategy in the category.

Only one recommended strategy 106 is shown in FIG. 1, which is only an example, rather than a specific limitation to the present disclosure. If there are a plurality of protection strategies in one category, the plurality of protection strategies may be recommended as recommended strategies to a user of the data assets to be configured with protection strategies for the user to choose.

By means of the method, a user can easily select a proper protection strategy and can effectively reuse existing strategies, thereby improving user experience.

Figure 2:
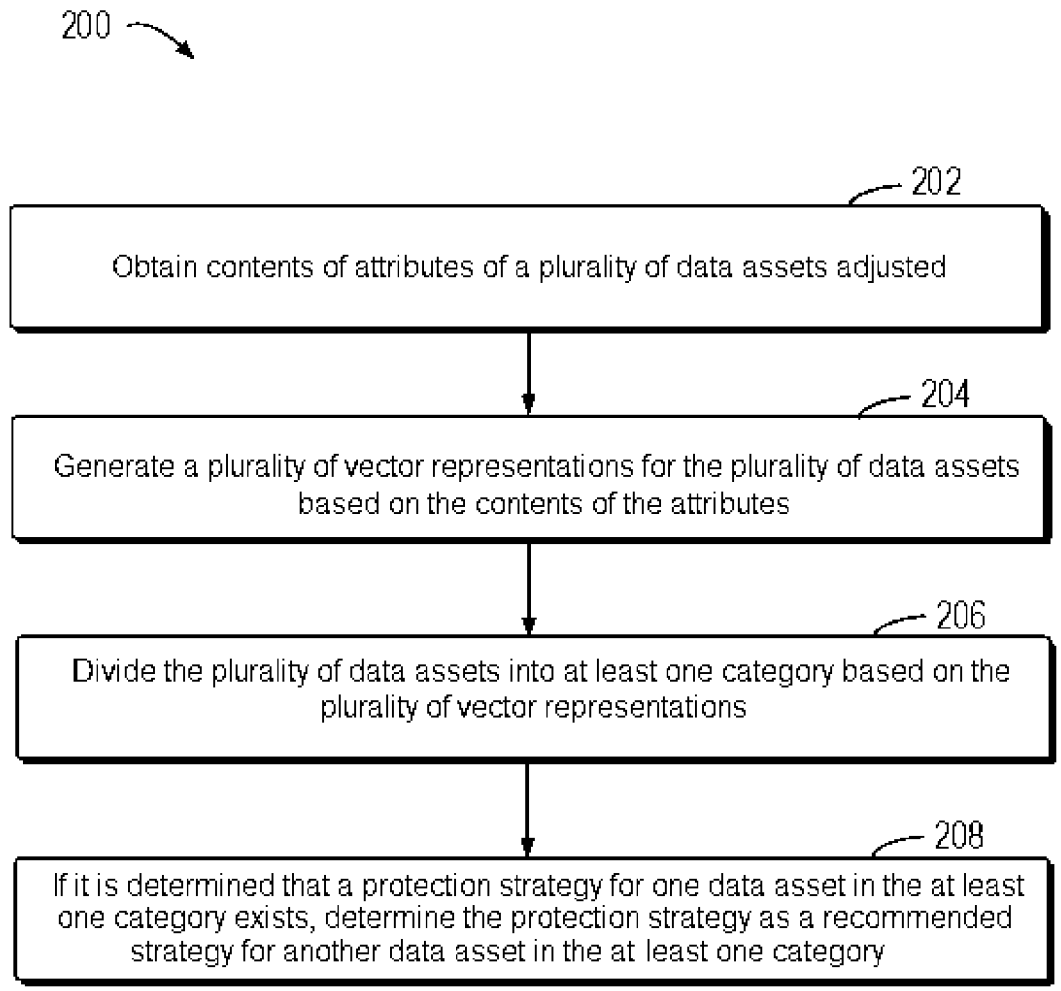
FIG. 2 illustrates a flow chart of method 200 for recommending a protection strategy according to an embodiment of the present disclosure.

The block diagram of example system 100 in which embodiments of the present disclosure can be implemented has been described in combination with FIG. 1. A flow chart of method 200 for recommending a protection strategy according to the embodiment of the present disclosure will be described below in combination with FIG. 2. Method 200 may be executed at computing device 102 in FIG. 1 or any suitable computing device.

At block 202, computing device 102 obtains contents of attributes of a plurality of data assets adjusted. Computing device 102 obtains the contents of the attributes of the data assets to conduct digital representation of the data assets.

In some embodiments, computing device 102 will obtain the attributes of the plurality of data assets when the data assets are being adjusted. Therefore, computing device 102 will determine whether there are data assets that are being adjusted. In an example, computing device 102 finds data assets that are being added. In another example, computing device 102 finds new data assets that have been added. If it is determined that data assets that are being adjusted exist, computing device 102 obtains contents of attributes of data assets that were adjusted in a predetermined historical period. Alternatively or additionally, computing device 102 will further obtain contents of attributes of existing data assets that have not been adjusted. In this way, strategies may be quickly recommended when the data assets are adjusted.

In some embodiments, computing device 102 will determine whether a protection strategy for at least one of the plurality of data assets is adjusted. For example, a protection strategy is allocated to data assets not allocated with a protection strategy, or a protection strategy of data assets that have been allocated with the protection strategy is adjusted. If it is determined that a protection strategy for at least one of the plurality of data assets is adjusted, the contents of the attributes of the plurality of data assets are obtained. In this way, strategies may be quickly recommended when the protection strategies are adjusted.

In some embodiments, the attributes of the data assets used in the present disclosure are attributes that are selected from all the attributes of the data assets and can be configured for clustering of the data assets. Alternatively or additionally, the contents of the attributes of the data assets confirm to normal distribution, discrete distribution, or uniform distribution. Typically, attributes for which all assets have the same value or null values are not selected. For example, for a virtual machine, attributes such as a size of the virtual machine in bytes, a total size of the storage space, a used size of the storage space, the number of disks that are occupied by the virtual machine, and the like may be selected.

At block 204, computing device 102 generates a plurality of vector representations for the plurality of data assets based on the contents of the attributes. To facilitate classifying of the data assets, the vector representations for the data assets are typically generated by using the contents of the attributes.

In some embodiments, computing device 102 adjusts the obtained contents of the attributes to obtain a vector representation for each of the plurality of data assets. Alternatively or additionally, if it is determined that a content item in the contents of the attributes is of a numerical value type, the computing device maps the content item to a predetermined numerical value range. For example, if one content item in the contents of the attributes is of the numerical value type, the content item is subjected to normalization, and the value of the content item is mapped to be between 0 and 1. In an example, a minimum value-maximum value normalization algorithm may be used, as shown in the following formula:

$$x' = \frac{x - \min_A}{\max_A - \min_A}$$

where x is a value of an attribute A of one data asset, x' is a value obtained after normalization, $\min_A$ represents a minimum value of attributes A in all the data assets, and $\max_A$ represents a maximum value of attributes A in all the data assets. The above example is only for describing the embodiment of the present disclosure, rather than specifically limiting the present disclosure. Those skilled in the art may adopt any suitable method to map a value of a content item in the contents of the attributes to any predetermined suitable numerical value range.

If it is determined that a content item in the contents of the attributes is of a non-numerical value type, the content item is mapped to a unique indicated value. For example, a content item of the attributes is of an enumeration type or a character string type, and then the content item is mapped to a unique indicated value through a one-hot encoding algorithm or other suitable algorithms.

At block 206, computing device 102 divides the plurality of data assets into at least one category based on the plurality of vector representations. The data assets are classified by performing processing using the plurality of vector representations.

In some embodiments, the plurality of data assets are subjected to a clustering operation to be divided into at least one category. In this way, the data assets can be quickly classified. In an example, the data assets are subjected to a clustering operation by adopting a K-means clustering algorithm. In another example, the data assets are subjected to a clustering operation by adopting a Mean-Shift clustering algorithm. The above examples are intended to describe the present disclosure only and are not specific limitations to the present disclosure. Those skilled in the art may perform the clustering operation by adopting any suitable clustering algorithm.

In some embodiments, computing device 102 determines a variation range of the number of the categories to be obtained by division. For example, the data assets are respectively clustered to M categories, where M is an integer in an interval [0, 20% of the number of total assets]. Therefore, in this process, the plurality of data assets may be clustered to a first number of categories, for example, clustered to two categories. Then, a first silhouette coefficient for the first number of categories is determined. Next, the computing device clusters the plurality of data assets to a second number of categories, for example, clustering to three categories. Then, a second silhouette coefficient for the second number of categories is determined. In this way, calculation is performed until a target number of the categories is obtained, and a corresponding silhouette coefficient is obtained as well, for example, a silhouette coefficient for categories in the number of 20% of the number of the total assets. After that, the first silhouette coefficient, the second silhouette coefficient, and other obtained silhouette coefficients are compared to select the number of categories corresponding to the maximum silhouette coefficient as the target number. Then, the plurality of data assets are divided into the target number of categories. Through the method, the number of categories can be quickly determined. The process of determining the number of categories is described below in combination with FIG. 3.

Figure 3:
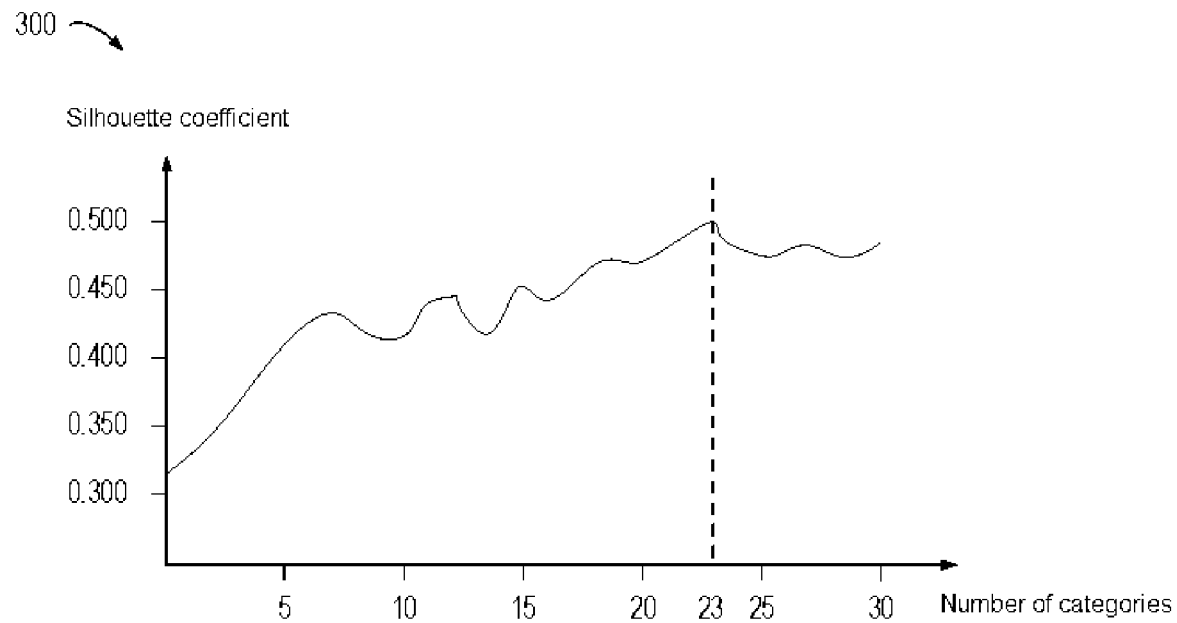
FIG. 3 illustrates a schematic diagram of example 300 of a relational graph of the numbers of categories and silhouette coefficients according to an embodiment of the present disclosure.

As shown in FIG. 3, the range of the number of categories to be obtained through clustering is determined, wherein the number of the categories is in a range of 1 to 30. When the number of the categories obtained in a clustering result is between 1 to 30, a corresponding silhouette coefficient is calculated. It can be seen from the curve in FIG. 3 that silhouette coefficients of different magnitudes will be obtained after different numbers of categories are obtained through clustering. The number of categories that is corresponding to the maximum silhouette coefficient is then selected. FIG. 3 shows that the silhouette coefficient is the maximum when the data assets are divided into 23 categories. Therefore, 23 is selected as the target number of categories.

Now referring back to FIG. 2 to continue description, at block 208, if computing device 102 determines that a protection strategy for one data asset in the at least one category exists, the protection strategy is determined as a recommended strategy for another data asset in the at least one category.

In some embodiments, if there is a protection strategy for some data assets in one category, the protection strategy is recommended to users of data assets in this category to which the protection strategy is not applied.

In some embodiments, if there are a plurality of protection strategies for data assets in one category, computing device 102 recommends the plurality of protection strategies to data assets that are not allocated with protection strategies for selection by users. Alternatively or additionally, for data assets to which protection strategies have been allocated, other protection strategies in the category may also be recommended to users of the data assets.

In some embodiments, if it is determined that there is no protection strategy for all data assets in at least one category, computing device 102 determines a default strategy as a recommended strategy for the data assets in the at least one category, or no operation is made. An example of a recommended strategy is described below in combination with FIG. 4.

Figure 4:
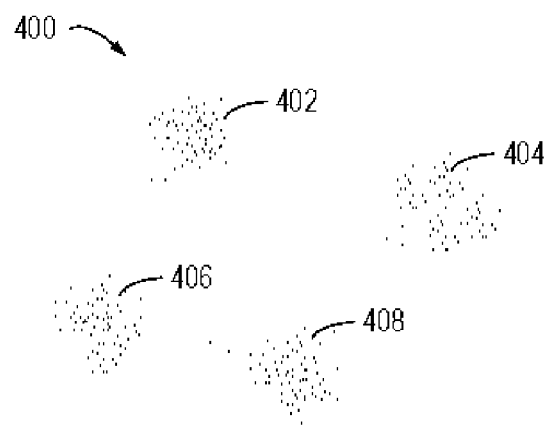
FIG. 4 illustrates a schematic diagram of example 400 of a classifying result according to an embodiment of the present disclosure.

As shown in FIG. 4, it shows example 400 of a classifying result according to an embodiment of the present disclosure.

It can be seen that data assets are clustered to four categories 402, 404, 406, and 408. If the data assets in category 402 do not include a protection strategy, a recommended protection strategy may not be generated for the data assets in this category, or a default protection strategy may be used as the recommended strategy. If there is only one protection strategy for the data assets in category 404, the protection strategy is recommended to other data assets in category 404 to which no protection strategy is applied. If there are a plurality of protection strategies in category 406 or 408, the plurality of protection strategies may be recommended to the data assets in category 406 or 408 for selection by users.

By means of the method, a user can easily select a proper protection strategy and can effectively reuse existing strategies, thereby improving user experience.

Figure 5:
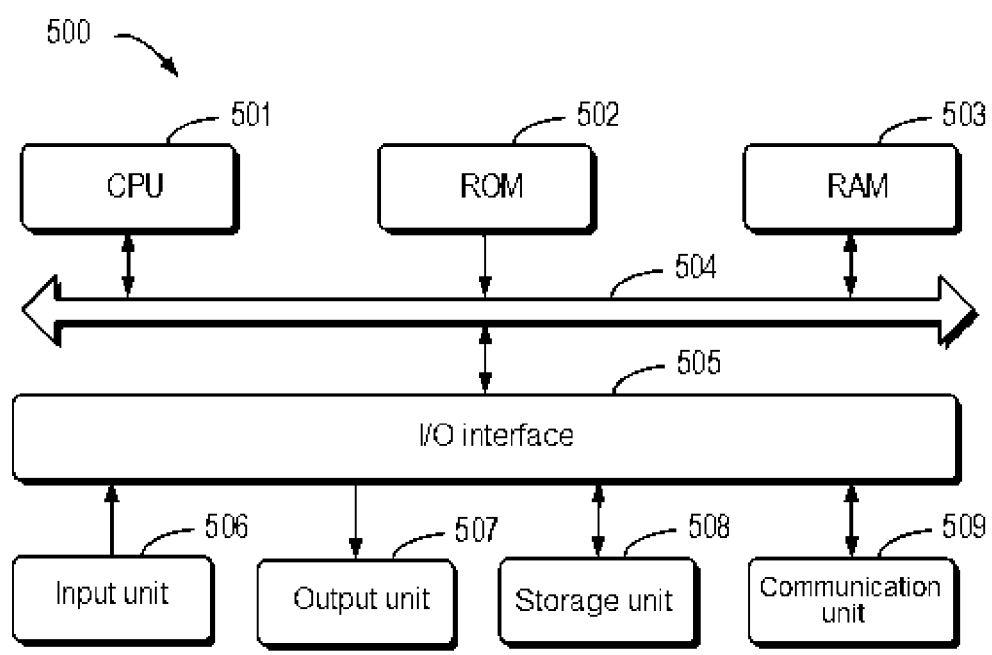
FIG. 5 illustrates a schematic block diagram of example device 500 suitable for implementing embodiments of the present disclosure.

FIG. 5 illustrates a schematic block diagram of example device 500 that can be used to implement embodiments of the present disclosure. Computing device 102 in FIG. 1 can be implemented using device 500. As shown in the figure, device 500 includes central processing unit (CPU) 501, which may execute various appropriate actions and processing in accordance with computer program instructions stored in read-only memory (ROM) 502 or computer program instructions loaded from storage unit 508 onto random access memory (RAM) 503. Various programs and data required for the operation of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage page 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various processes and processing described above, such as method 200, may be performed by processing unit 501. For example, in some embodiments, method 200 may be implemented as a computer software program that is tangibly included in a machine-readable medium, such as storage unit 508. In some embodiments, part of or all the computer program may be loaded and/or installed to device 500 via ROM 502 and/or communication unit 509. When the computer program is loaded into RAM 503 and executed by CPU 501, one or more actions of method 200 described above may be performed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the accompanying drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

The invention claimed is:

1. A method for protecting data asset by recommending a protection strategy, comprising:
   obtaining contents of attributes of a plurality of data assets that were adjusted;
   generating a plurality of vector representations for the plurality of data assets based on the contents of the attributes;
   dividing the plurality of data assets into at least one category based on the plurality of vector representations; and
   in response to that a protection strategy for a data asset in the at least one category exists, determining the protection strategy as a recommended strategy for another data asset in the at least one category; and
   backing up the another data asset in the at least one category according to the recommended strategy in response to a user selecting the recommended strategy.

2. The method according to claim 1, wherein obtaining the contents of the attributes comprises:
   in response to that a data asset that is being adjusted exists, obtaining contents of attributes of data assets that were adjusted in a predetermined historical period; or
   in response to that a protection strategy for at least one of the plurality of data assets is adjusted, obtaining the contents of the attributes of the plurality of data assets.

3. The method according to claim 1, wherein determining the plurality of vector representations comprises:
   adjusting the contents of the attributes to obtain a vector representation for each of the plurality of data assets.

4. The method according to claim 3, wherein adjusting the contents of the attributes comprises:
   in response to that a content item in the contents of the attributes is of a numerical value type, mapping the content item to a predetermined numerical value range; and
   in response to that a content item in the contents of the attributes is of a non-numerical value type, mapping the content item to a unique indicated value.

5. The method according to claim 1, wherein dividing the plurality of data assets into the at least one category comprises:
   performing a clustering operation on the plurality of data assets.

6. The method according to claim 5, wherein performing the clustering operation on the plurality of data assets comprises:
   clustering the plurality of data assets to a first number of categories;
   determining a first silhouette coefficient for the first number of categories;
   clustering the plurality of data assets to a second number of categories;
   determining a second silhouette coefficient for the second number of categories;
   determining a target number of categories based on the first silhouette coefficient and the second silhouette coefficient; and
   dividing the plurality of data assets into the target number of categories.

7. The method according to claim 1, further comprising:
   in response to that there is no protection strategy for all the data assets in the at least one category, determining a default strategy as a recommended strategy for the data assets in the at least one category.

8. An electronic device, comprising:
   at least one processor; and
   a memory coupled to the at least one processor and having instructions stored thereon, wherein the instructions, when executed by the at least one processor, cause the device to perform actions including:

obtaining contents of attributes of a plurality of data assets that were adjusted;

generating a plurality of vector representations for the plurality of data assets based on the contents of the attributes;

dividing the plurality of data assets into at least one category based on the plurality of vector representations;

in response to that a protection strategy for a data asset in the at least one category exists, determining the protection strategy as a recommended strategy for another data asset in the at least one category; and backing up the another data asset in the at least one category according to the recommended strategy in response to a user selecting the recommended strategy.

9. The electronic device according to claim 8, wherein obtaining the contents of the attributes comprises:

in response to that a data asset that is being adjusted exists, obtaining contents of attributes of data assets that were adjusted in a predetermined historical period; or in response to that a protection strategy for at least one of the plurality of data assets is adjusted, obtaining the contents of the attributes of the plurality of data assets.

10. The electronic device according to claim 8, wherein determining the plurality of vector representations comprises:

adjusting the contents of the attributes to obtain a vector representation for each of the plurality of data assets.

11. The electronic device according to claim 10, wherein adjusting the contents of the attributes comprises:

in response to that a content item in the contents of the attributes is of a numerical value type, mapping the content item to a predetermined numerical value range; and in response to that a content item in the contents of the attributes is of a non-numerical value type, mapping the content item to a unique indicated value.

12. The electronic device according to claim 8, wherein dividing the plurality of data assets into the at least one category comprises:

performing a clustering operation on the plurality of data assets.

13. The electronic device according to claim 12, wherein performing the clustering operation on the plurality of data assets comprises:

clustering the plurality of data assets to a first number of categories;

determining a first silhouette coefficient for the first number of categories;

clustering the plurality of data assets to a second number of categories;

determining a second silhouette coefficient for the second number of categories;

determining a target number of categories based on the first silhouette coefficient and the second silhouette coefficient; and dividing the plurality of data assets into the target number of categories.

14. The electronic device according to claim 8, wherein the actions further comprise:

in response to that there is no protection strategy for all the data assets in the at least one category, determining a default strategy as a recommended strategy for the data assets in the at least one category.

15. A non-transitory machine-readable medium having instructions stored therein, which when executed by a processor, cause the processor to perform operations, the operations comprising:

obtaining contents of attributes of a plurality of data assets that were adjusted;

generating a plurality of vector representations for the plurality of data assets based on the contents of the attributes;

dividing the plurality of data assets into at least one category based on the plurality of vector representations;

in response to that a protection strategy for a data asset in the at least one category exists, determining the protection strategy as a recommended strategy for another data asset in the at least one category; and backing up the another data asset in the at least one category according to the recommended strategy in response to a user selecting the recommended strategy.

16. The machine-readable medium according to claim 15, wherein obtaining the contents of the attributes comprises:

in response to that a data asset that is being adjusted exists, obtaining contents of attributes of data assets that were adjusted in a predetermined historical period; or in response to that a protection strategy for at least one of the plurality of data assets is adjusted, obtaining the contents of the attributes of the plurality of data assets.

17. The machine-readable medium according to claim 15, wherein determining the plurality of vector representations comprises:

adjusting the contents of the attributes to obtain a vector representation for each of the plurality of data assets.

18. The machine-readable medium according to claim 17, wherein adjusting the contents of the attributes comprises:

in response to that a content item in the contents of the attributes is of a numerical value type, mapping the content item to a predetermined numerical value range; and in response to that a content item in the contents of the attributes is of a non-numerical value type, mapping the content item to a unique indicated value.

19. The machine-readable medium according to claim 15, wherein dividing the plurality of data assets into the at least one category comprises:

performing a clustering operation on the plurality of data assets.

20. The machine-readable medium according to claim 19, wherein performing the clustering operation on the plurality of data assets comprises:

clustering the plurality of data assets to a first number of categories;

determining a first silhouette coefficient for the first number of categories;

clustering the plurality of data assets to a second number of categories;

determining a second silhouette coefficient for the second number of categories;

determining a target number of categories based on the first silhouette coefficient and the second silhouette coefficient; and dividing the plurality of data assets into the target number of categories.

* * * * *